(12) United States Patent
Liu

(10) Patent No.: US 12,072,898 B1
(45) Date of Patent: *Aug. 27, 2024

(54) ATTENTION SPOTS IN A MAP INTERFACE

(71) Applicant: Google LLC, Mountain View, CA (US)

(72) Inventor: Yifang Liu, Redwood City, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/407,990

(22) Filed: Aug. 20, 2021

Related U.S. Application Data

(63) Continuation of application No. 15/687,893, filed on Aug. 28, 2017, now Pat. No. 11,100,114, which is a continuation of application No. 14/452,952, filed on Aug. 6, 2014, now Pat. No. 9,747,346.

(51) Int. Cl.

| | |
|---|---|
| G06F 15/16 | (2006.01) |
| G06F 16/2457 | (2019.01) |
| G06F 16/44 | (2019.01) |
| G06F 16/9537 | (2019.01) |
| G06Q 30/0251 | (2023.01) |

(52) U.S. Cl.
CPC ...... *G06F 16/24578* (2019.01); *G06F 16/444* (2019.01); *G06F 16/9537* (2019.01); *G06Q 30/0259* (2013.01)

(58) Field of Classification Search
None
See application file for complete search history.

(56) References Cited

U.S. PATENT DOCUMENTS

| | | |
|---|---|---|
| 8,368,723 B1 | 2/2013 | Gossweiler, III et al. |
| 8,504,945 B2 | 8/2013 | Jakobson et al. |
| 2006/0271531 A1 | 11/2006 | O'Clair et al. |
| 2008/0086356 A1 | 4/2008 | Glassman et al. |
| 2011/0050732 A1 | 3/2011 | Arrasvuori |
| 2011/0173572 A1 | 7/2011 | van Zwol et al. |
| 2012/0094636 A1 | 4/2012 | Li et al. |
| 2012/0166416 A1* | 6/2012 | Murdock ............ G06Q 30/0277 707/711 |
| 2012/0179548 A1* | 7/2012 | Sun .................... G06Q 30/0261 705/14.58 |
| 2013/0035853 A1 | 2/2013 | Stout et al. |
| 2013/0061165 A1 | 3/2013 | Adkins |

(Continued)

*Primary Examiner* — Alex Gofman
(74) *Attorney, Agent, or Firm* — DORITY & MANNING P.A.

(57) ABSTRACT

Methods, systems, and apparatus, including computer programs encoded on a computer storage medium, for providing content items based on a location of a user's attention in a map interface. In one aspect, a method includes receiving data specifying one or more map attention spots in a viewport of a map interface presented at a user device. Each map attention spot is a location on a map of the map interface corresponding to a specified amount of user activity. Content items are identified for presentation with the map. For each content item and map attention spot, a distance between a presentation location for the content item on the map and a location of the identified map attention spot on the map is determined. A rank score for the content item based at least on a respective content item score for the content item and each determined distance for the content item.

18 Claims, 9 Drawing Sheets

(56) References Cited

U.S. PATENT DOCUMENTS

| | | |
|---|---|---|
| 2013/0073581 A1 | 3/2013 | Sandholm |
| 2013/0080427 A1 | 3/2013 | Cross et al. |
| 2013/0332068 A1 | 12/2013 | Kesar et al. |
| 2014/0040236 A1 | 2/2014 | Vijaywargi et al. |
| 2014/0078183 A1 | 3/2014 | Watson et al. |
| 2015/0058345 A1 | 2/2015 | Mishra et al. |
| 2015/0356501 A1 | 12/2015 | Gorjestani et al. |
| 2016/0034464 A1 | 2/2016 | Sinha |

* cited by examiner

ATTENTION SPOTS IN A MAP INTERFACE

CROSS-REFERENCE TO RELATED APPLICATIONS

This application is a continuation of U.S. application Ser. No. 15/687,893, filed Aug. 28, 2017, which is a continuation of U.S. application Ser. No. 14/452,952, filed Aug. 6, 2014, the contents of each are incorporated by reference herein.

BACKGROUND

The Internet enables access to a wide variety of resources. For example, video, audio, web pages directed to particular subject matter, news articles, images, maps, and other resources are accessible over the Internet. The wide variety of resources that are accessible over the Internet has enabled opportunities for content distributors to provide content items with resources that are requested by users. Content items are units of content (e.g., individual files or a set of files) that are presented in/with resources (e.g., web pages, applications, etc.). An advertisement is an example of a content item that advertisers can provide for presentation with particular resources, such as web pages and search results pages. An advertisement can be made eligible for presentation with specific resources and/or resources that are determined to match specified distribution criteria, such as distribution keywords.

One resource that publishers can include in a website is an online map. Some publishers provide maps that are very sophisticated and allow users to view traditional street maps, street maps including representations of the actual buildings, and even satellite images.

SUMMARY

This specification describes technologies relating to determining the location of a user's attention in a map interface.

In general, one innovative aspect of the subject matter described in this specification can be embodied in methods that include the actions of receiving data specifying one or more map attention spots in a viewport of a map interface that was presented at a user device, each map attention spot being a location on a map of the map interface corresponding to a specified amount of user activity; identifying content items for presentation with the map, each content item having a respective content item score that represents a relative importance of the content item on the map; for each content item: determining, for each identified map attention spot, a distance between a presentation location for the content item on the map and a location of the identified map attention spot on the map; and determining a rank score for the content item based at least on the respective content item score for the content item and each determined distance; selecting one or more of the content items based on the rank score for each content item; and generating and transmitting data that cause presentation of the one or more selected content items at a user device. Other embodiments of this aspect include corresponding systems, apparatus, and computer programs, configured to perform the actions of the methods, encoded on computer storage devices.

These and other embodiments can each optionally include one or more of the following features. Some aspects include determining an attention score for each map attention spot based on an amount of user activity related to the location of the map attention spot.

In some aspects, the rank score for each content item is based on an attention spot-content item score for each identified map attention spot with respect to the content item. The attention spot-content item score for a particular map attention spot and a particular content item can be based on the attention score for the particular attention spot and the distance between the location for the particular content item on the map and the location of the particular map attention spot on the map.

In some aspects, the attention spot-content item score for the particular map attention spot and the particular content item is directly proportional to the attention score for the particular map attention spot and indirectly proportional to the distance between the location for the particular content item on the map and the location of the particular map attention spot on the map.

In some aspects, the attention score for a particular map attention spot is based on multiple user activity events related to the location of the particular map attention spot and an effect of each user activity event on the attention score decreases over time based on a decay function. In some aspects, the attention score for a particular map attention spot is based on one or more of (a) a number of queries received by a map search function related to the location of the particular map attention spot, (b) a number of queries received by a web search function related to the location of the particular map attention spot, or (c) a number of user interactions with a search result for the location of the particular map attention spot.

In some aspects, identifying the one or more map attention spots includes identifying candidate map attention spots that are located in the viewport of the map interface and selecting, as the one or more map attention spots, each candidate attention spot that has an attention score that exceeds a threshold attention score. In some aspects, determining the rank score for a particular content item includes increasing the rank score for the particular content item based on the distance between the presentation location for the particular content item and the location of the identified map location spot being less than a specified distance.

Particular embodiments of the subject matter described in this specification can be implemented so as to realize one or more of the following advantages. By identifying areas of a map in which a user is likely focusing attention, content items that are relevant to the user's interests can be provided to the user. Content item providers that have locations at or near a location on a map being viewed by a user can benefit from their content items being provided to users that are interested in that location.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes systems and techniques for determining one or more areas of a map interface at which users are likely to be focusing their attention. The location of these areas can then be used to rank and provide content items (e.g., advertisements, suggested content, reviews, etc.) in which the user may be interested. The location on the map at the center of a viewport that displays a portion of the map can be considered the area at which the user is likely viewing. However, a user's attention is often focused at other areas of the map, such as the location on the map that is to one side of the viewport.

In some implementations, the system generates a heat map that includes map attention spots. The map attention spots are locations on the map portion presented in the viewport that are likely the focal points that receive more of the users' attention. The map attention spots may be identified based on user activity with respect to the geographic location or entity located at the geographic location represented by the map attention spot. For example, if a large number of queries (e.g., greater than a specified threshold number) are received for a particular park, the location of the park on the map may be deemed a map attention spot. Content items for locations that are close to a map attention spot on the map may be ranked higher (or receive a boost in ranking) than content items that are located further away from the map attention spot.

A user's interaction(s) with a map interface can also be used to determine one or more areas of the map at which the user is likely to be viewing. For example, a direction in which a user repositions a map in a viewport can be used to determine the one or more areas. For example, a user may change the map portion that is visible in the viewport by panning or scrolling in a particular direction. A line may be determined based on the trajectory of the repositioning of the map in the viewport. For example, if point A on the map is at the center of the viewport before the user scrolls the map interface and point B on the map is at the center of the viewport after the user scrolls the map interface, a line from point A to point B may be determined. Content items for locations that are close to the line (e.g., within a threshold distance of either side of the line) may be ranked higher (or receive a boost in ranking) than content items that are located further away from the line. The line may extend past point A and/or point B.

Figure 1:
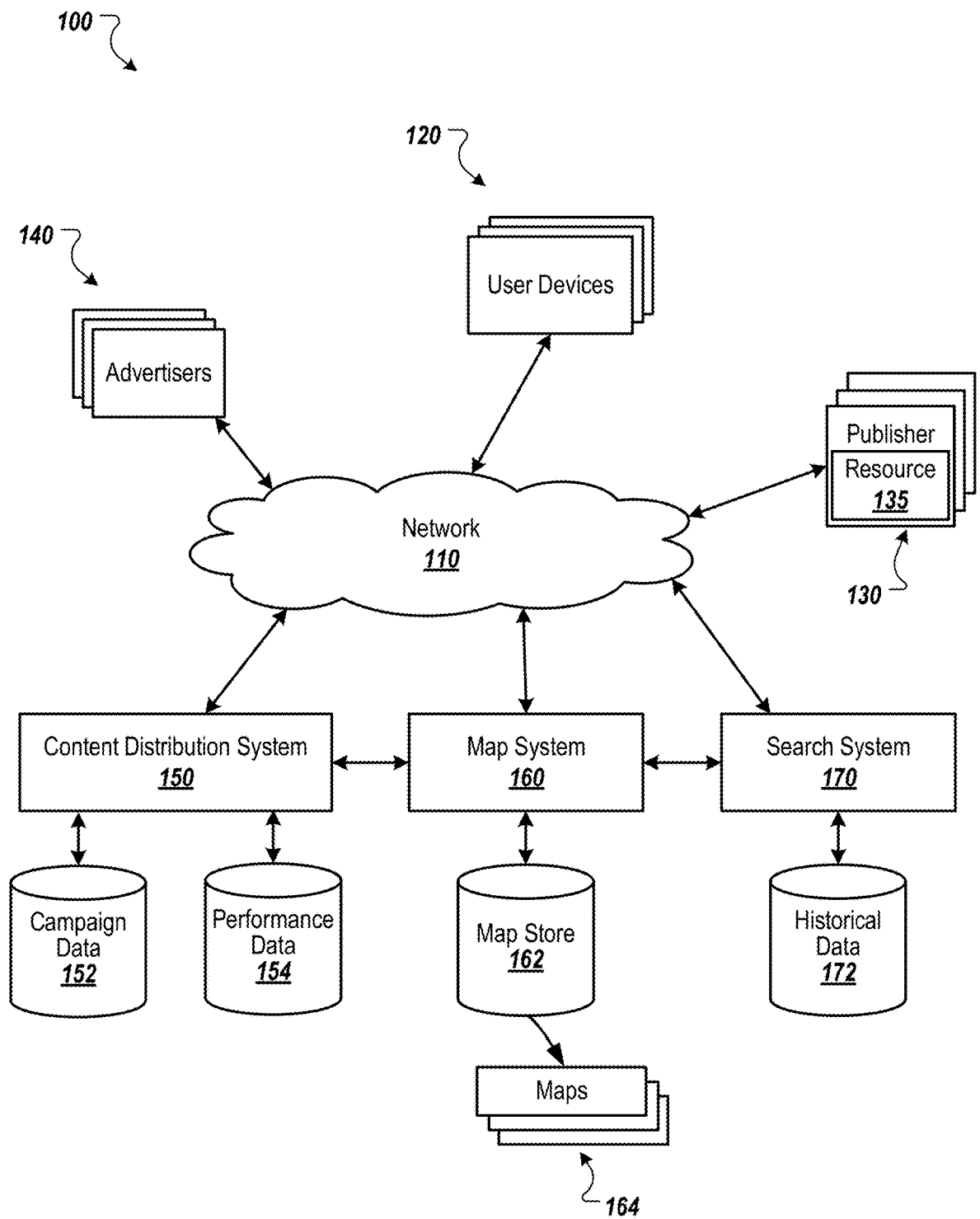
FIG. 1 is an example environment in which a content distribution system distributes content items.

FIG. 1 is an example environment 100 in which a content distribution system 150 distributes content items. The example environment 100 includes a network 110 such as a local area network (LAN), wide area network (WAN), the Internet, or a combination thereof. The network 110 connects user devices 120, publishers 130, advertisers 140, the content distribution system 150, a map system 160, and a search system 170. The content distribution system 150, map system 160, and search system 170 can each be implemented as a system of one or more computers. The example environment 100 may include many user devices 120, publishers 130, and advertisers 140.

A user device 120 is an electronic device that is capable of requesting and receiving resources over the network 110. Example user devices 120 include personal computers, mobile communication devices (e.g., smartphones, tablet computing devices, and/or smart watches), and other devices that can send and receive data over the network 120. A user device 120 typically includes a user application, such as a web browser, to facilitate the sending and receiving of data over the network 110. The web browser can enable a user to display and interact with text, images, videos, music, maps, and other information typically located on a web page at a website. The user devices 120 can also include applications (also referred to as apps) that can enable a user to display and interact with similar content.

Publishers 130 can be network content providers that publish websites and/or applications (e.g., mobile apps). A website includes one or more resources 135 associated with a domain name and hosted by one or more servers. An example website is a collection of web pages formatted in hypertext markup language (HTML) that can contain text, images, multimedia content, and programming elements, such as scripts.

A resource is any data that can be provided by the publisher 130 over the network 110. Resources include HTML pages, word processing documents, and portable document format (PDF) documents, images, video, maps, and feed sources, to name just a few. The resources can include content, such as words, phrases, pictures, and so on, and may include embedded information (e.g., meta information and hyperlinks) and/or embedded instructions (e.g., scripts).

The publishers 130 can receive requests for content from the user devices 120 and provide content (e.g., a resource 135) for presentation in response to the requests. The publishers 130 may also include maps 164 with the content, thereby allowing the user devices 120 access to maps through the publisher's website. In some implementations, the publishers 130 can include a map 164 with the requested content by requesting the map 164 from the map system 160. In response to the map request by the publisher 130, the map system 160 selects data for the requested map 164 from a map store 162 for presentation at the user device 120.

In some implementations, a map 164 can be presented as a web page. For example, a web browser of a user device 120 can be used to request from the map system 160 a web page that includes the map 164. A map can also be presented using a mapping software application running on the user device 120. For example, the user device 120 can be a smartphone or tablet computing device that can download and execute a map app, and a user can interact with the map app to request map information from the map system 160. The map app can use the requested information to generate and present the map 164 to the user.

A map 164 can also be provided in response to a query submitted to the search system 170. For example, the search system 170 may allow users to search for maps of particular locations or for directions between locations. In response to a query, the search system 170 can request a map 164 from the map system 160 based on the query. The search system 170 can also request and provide a map in response to general web queries. For example, if a query includes location related data or references an entity that has a location, the search system 170 may provide a map as a search result or with a search result page.

The search system 170 includes a historical data store 172 that includes data from and related to previous queries received by the search system 170. For example, the historical data store 172 can include an index of queries received by the search system 170 and actions (e.g., selections) taken with respect to search results provided in response to the queries. The historical data store 172 can include data related to map queries and locations within a provided map that received a user interaction. This data can be used to determine the number of queries related to particular locations on a map and/or the number of interactions with such locations.

A map 164 can be presented using a map interface that allows users to interact with the map. The map interface may include a viewport that displays a portion of the map to the user. For example, the map may be too large to present on a display of the user device 120. A viewport may present a portion of the map that is relevant to the user. The user can then reposition the map in the viewport (e.g., by panning or scrolling) and/or zoom within the viewport to view other areas of the map 164.

A request for a map 164 can include or generate a request for one or more content items. For example, a request for a map can include a request for advertisements. In response to the request, the map system 160 and/or the user device 120 for which the map is intended can request the content item(s) from the content distribution system 150. The content distribution system 150 can select one or more content items based on the request and provide the content item(s) to the device or system that requested the content item(s), as described in more detail below.

In some implementations, the request for a map 164 includes a request for content items, and the content items are delivered to the map system 160 by the content distribution system 150. The map system 160 can integrate the content items into the map 164 by placing the content items on the map. The content items can be placed on the map at a location representative of the location associated with the advertiser 140 (e.g., a map of the retail location of the advertiser) or other content item provider. The content items can be placed on the map 164 by embedding the content items in the map 164, e.g., rendering the sponsored content in the map 164, e.g., rendering the content items as part of the map 164.

In some implementations, a map interface or web page that includes a map can include content item slots. Such content item slots may be on the map 164, an overlay over the map 164, or to one side of the map 164. The content item slots can cause the user device 120 to request content items, for example, in response to the map 164 being rendered. In this example, the user device 120 requests the content items from the content distribution system 150 and presents the received content items with the map 164.

The content distribution system 150 includes a data storage system that stores campaign data 152 and performance data 154. The performance data 154 stores data indicating the performance of the content items that are served. Such performance data can include, for example, click-through rates for content items, the number of impressions for content items, and the number of conversions for content items (e.g., purchase of a product in response to the display of an advertisement or download of a mobile app or other application). Other performance data can also be stored. The campaign data 152 stores content items (e.g., advertisements, recommendations, suggested content, reviews, etc.), campaign criteria, bid values for content items, and budgeting information for advertisers 140. Suggested content may include content related to a query submitted by a user. For example, suggested content may include movie reviews, directions to theaters, movie schedules, or other information about movie theaters based on a query for movie theaters in an area.

The campaign data 152 and the performance data 154 can be used as input parameters to a content item selection process. For example, the campaign data 152 and the performance data 154 can be used as input parameters to an advertisement auction. In particular, the content distribution system 150, in response to each request for content items, can conduct an auction to select content items that are provided in response to the request. The content items are ranked according to a rank score. The highest ranked advertisements resulting from the auction are selected and provided to the requesting device or system.

The rank score may be based on a content item score that represents the relative importance of the content item with respect to other content items. For example, the content item score may be based on an advertisement bid and one or more parameters specified in the performance data 154. The content item score can also represent the content item's relative importance on the map and/or a particular location on the map being presented in a viewport. For example, a content item that has a location that is visible in a viewport may have a higher content item score than a content item that does not have a location that is visible in the viewport.

The rank score for content items may also be based on map data, for example, if the content items are being ranked for a presentation on or with a map. In some implementations, as described below with reference to FIGS. 2-5, the rank score for a content item can be based on a distance between a location for the content item on a map and the location of a map attention spot on the map. In some implementations, as described below with reference to FIGS. 6-9, the rank score for a content item can be based on a distance between a location for the content item and a point on a line extending between two map locations that is created in response to user interaction with a map interface.

Figure 2:
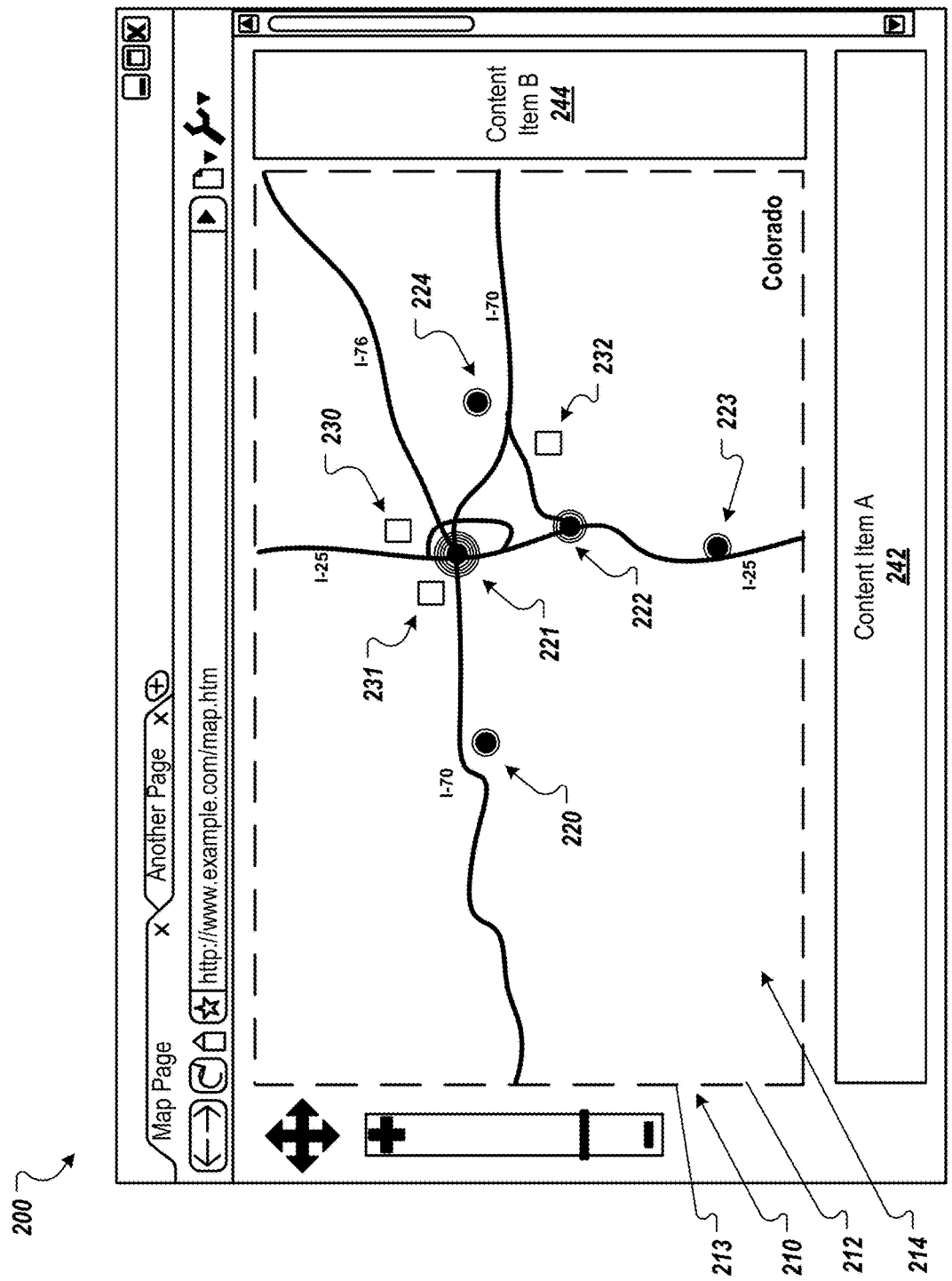
FIG. 2 depicts a web browser with an example map interface.

FIG. 2 depicts a web browser 200 with an example map interface 210. The example map interface 210 presents a map of an area in Colorado using a viewport 212. The viewport 212 shows a portion of a map 214 that includes the area of Colorado. For example, the map 214 may be a map of the continental United States, North America, or of the entire Earth, while the viewport 212 presents a portion of the map 214.

The area of the map 214 shown in the viewport 212 can be defined by a display region 213 and a zoom level. The display region 213 is the portion of the user's display that is allocated to present the map 214. The display region 213 can vary according to a number of factors including device limitations, user preferences, and publisher preferences, etc. The display region 213 can be defined by the size and resolution of the user device. For example, a tablet computer with a 7 inch display and 1920×1200 resolution can display more of a map than a handheld device having a 4 inch display and 1280×768 resolution. Accordingly, the area of the map 214 that the viewport 212 shows may be different when the display region 213 and resolution of each user device is different.

The map 214 includes map attention spots 220-224 and content item locations 230-232. The content item locations 230-232 are locations for respective content items. For example, the content item location 231 may represent the geographic location of a particular restaurant and the content item location 232 may represent the geographic location of a golf course. Some content items may have multiple content item locations. For example, a business may have multiple locations.

The map attention spots 220-224 are locations on the map 214 at which users are likely to focus their attention. The map attention spots may correspond to states, cities, neighborhoods, buildings, or other appropriate areas. The map attention spots 220-224 can be identified based on the amount of attention, or the amount of activity, that their respective locations receive. For example, the map attention spots 220-224 may be selected based on an amount of online activity with respect to the geographic location of the map attention spot 220-224 and/or an entity (e.g., business, building, organization, landmark, neighborhood, city, state, etc.) located at the geographic location of the map attention spot 220-224. A map attention spot 220-224 may be locations that correspond to at least a specified amount of user activity. For example, a location may be selected as a map attention spot if the location has received at least the specified amount of user activity or at least the specified amount of activity in a particular time period.

The online activity for a map attention spot 220-224 can include the number of queries received by a search system that is related to the location (and/or entity) of the map attention spot 220-224, the number of selections of search results related to the location (and/or entity) that are provided and/or selected by users, the number of selections of the location (and/or entity) in a map interface, the number of times the location (and/or entity) is presented in a viewport of the map interface, and/or other appropriate online activity that relates to the location. For example, the online activity for a particular city may include the number of received queries that include the city's name and/or the number of times the city is presented in a viewport of a map.

The online activity for locations on the map 214 can be used to determine an attention score for each location. The attention score for a location can be based on the amount of user activity for the location or entity at that location. For example, if the location for map attention spot 220 has received more user activity than the location for map attention spot 221, map attention spot 220 may have a higher attention score than map attention spot 221. The attention scores for the locations can then be used to select the attention spots. For example, locations for which the attention score is high (e.g., greater than an attention score threshold) may be deemed map attention spots. In FIG. 2, the number of rings around each map attention spot 220-224 represents the value of the attention scores for the attention spots 220-224. For example, the map attention spot 221 has a higher attention score than the map attention spot 220 as the map attention spot 221 has more rings than the map attention spot 220.

The attention scores may be based on user activity that occurs within a particular period of time. For example, user activity that is more than a year old may not be considered in determining the attention scores. In some implementations, the effect of a user activity event (e.g., receipt of a query, selection of a search result, etc.) on the attention score for a map attention spot may decrease over time. For example, the effect of a user activity event may decrease over time based on a decay function, such as an exponential fading function or a linear fading function. In this example, more recent user activity events contribute more to the attention score than older user activity events. The effect of a user activity event on the attention score for a map attention spot can be determined using the relationship $N=N_0 e^{-\lambda t}$, in which N is the effect on the attention score for the map attention spot; $N_0$ is the attention effect contribution of an event if it happens at the time the effect is determined; t is the elapsed time since the event actually happened; and X is a fading parameter.

The effect of a user activity event can also be spread to locations on the map 214 around the location of the event. For example, if a user submits a query that includes the location "Atlanta," the effect of this event may be spread to surrounding cities. A space-decaying function can be used to determine the effect of an event on the surrounding areas. For example, the relationship $N=N_0 e^{-\lambda d}$, in which N is the effect of an event on the attention score for a location under consideration; $N_0$ is the effect of an event on the attention if the event is for the location under consideration; d is the distance between the event location and the location under consideration; and X is a fading parameter.

The attention scores for the map attention spots 220-224 can be used to determine the rank scores for content items. For example, map attention spots that have higher attention scores are typically locations on the map 214 where users focus their attention and activities. Thus, these map attention spots are more likely to be the location on the map 214 that the user is viewing even if these map attention spots are not in the center of the viewport 212.

The rank score for a content item can be based on the attention scores of one or more map attention spots 220-224. For example, the rank score for a content item may be based on the value of the attention score of a map attention spot 220-224 (e.g., greater attention score results in higher rank score) and the distance between the content item location 230-233 for the content item on the map 214 and the location of the map attention spot 220-224 on the map 214. In this example, the effect that a map attention spot 220-224 has on a content item may decrease with an increase in distance between the map attention spot and the content item's location, e.g., based on a decay function. In a particular example, the map attention spot 221 may have a greater effect (e.g., greater boost) on the rank score of the content item for content item location 231 than its effect on the rank score of the content item for content item location 232 due to the difference in distances.

In some implementations, the effect that a map attention spot 220-224 has on a content item's rank score may be based on whether the content item's location is within a threshold distance of the map attention spot 220-224. If the content item's location is within a threshold distance of the map attention spot 220-224, the content item's rank score may receive a boost (e.g., increase) based on the attention score for the 220-224. For example, a higher attention score may result is a greater boost to the rank score. If the content item's location is not within the threshold distance, the content item's rank score may not receive a boost.

The rank score for a content item can be based on the attention scores for multiple map attention spots. For example, the rank score for a content item of content item location 232 may receive a boost from the attention score for map attention spot 222 and the attention score for map attention spot 224 as the content item location 232 is located near both map attention spots. In some implementations, an attention spot-content item score is determined for each of multiple map attention spots with respect to a content item and each attention spot-content item score is used to determine the rank score for the content item. An attention spot-content item score for a particular map attention spot and particular content item may be based on the attention score for the particular map attention spot and the distance between the particular map attention spot and the particular content item's location on the map 214. For example, the attention spot-content item score may be directly proportional to the attention spot score and indirectly proportional to the distance. In another example, the attention spot-content item score may decrease with an increase in distance based on a decay function.

In a particular example, a first attention spot-content item score can be determined for map attention spot 222 with respect to content item location 232 and a second attention spot-content item score can be determined for map attention spot 224 with respect to content item location 232. The rank score for the content item located at content item location 232 may be based on the first and second attention spot-content item scores and the content item score for the content item. For example, the first and second attention spot-content item scores can be used to boost the content item score, resulting in a higher rank score. In another example, the rank score for the content item may be proportional to a product of the content item score, the first attention spot-content item score, and the second attention spot-content item score.

Although there are five map attention spots 220-224 and three content item locations 230-232 shown in FIG. 2, there could be more or less of each. In some implementations, the number of map attention spots that can be used to rank content items in a particular viewport may be limited to those having a sufficient attention score. For example, a viewport may include multiple candidate map attention spots. The candidate map attention spots that have an attention score that fails to meet a specified attention score threshold may be filtered from a viewport. The filtered candidate map attention spots may not be used to determine the rank scores for content items that have locations in the viewport. Instead, the map attention spots that have an attention score that meets the attention score threshold may be selected as map attention spots for the viewport and used to determine the rank scores for the content items.

A rank score may be determined for a set of content items that have a location within the viewport 212. The set of content items may include all content items that have a location within the viewport or content items that are relevant to the user (e.g., based on contextual information) or to a query submitted by the user. For example, the set of content items may only include those content items that have distribution criteria (e.g., keywords) that match the contextual data. The content items having the highest rank score can be selected and provided for presentation with the map 214. For example, two content items 242 and 244 are presented with the map 214. These content items 242 and 244 may be for the two content item locations 230-232 that have the highest rank scores. The content items 242 and 244 can be for those particular locations. For example, the content item 242 may be for a particular restaurant at content item location 230. The content items 242 and 244 can also be for entities that have multiple locations, including one in the viewport 212. For example, the content item 244 may be for a business that has multiple locations, including one at content item location 231.

In some implementations, the user activity can be used to generate a heat map for the map. In such implementations, each location has an attention score based on user activity with respect to that location. The attention score for a particular location may also be based on the user activity for locations around the particular location, for example, using a decay function as described above. The rank score for a content item at a particular location on the map may be based on the attention score for that particular location.

Figure 3:
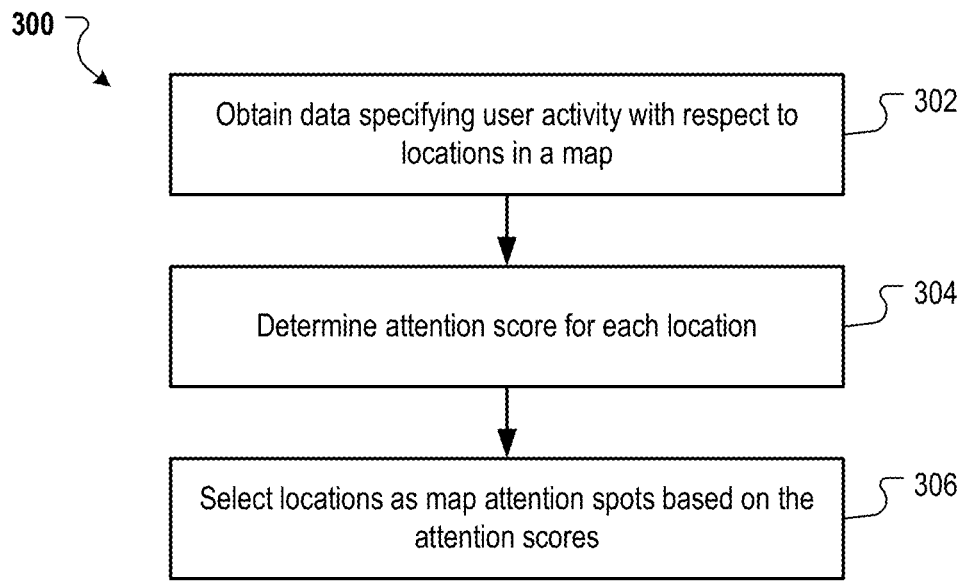
FIG. 3 is a flow chart of an example process for identifying map attention spots in a map interface.

FIG. 3 is a flow chart of an example process 300 for identifying map attention spots in a map interface. Operations of the process 300 can be implemented, for example, by a data processing apparatus, such as the map system 160 of FIG. 1. The process 300 can also be implemented by instructions stored on computer storage medium, where execution of the instructions by a data processing apparatus cause the data processing apparatus to perform the operations of the process 300.

Data specifying user activity with respect to locations on a map are received (302). As described above, this data can include online activity of multiple users. For example, the data may specify the number of queries received by a search system that are related to the location, the number of selections of search results related to the location that are provided and/or selected by users, the number of selections of the location in a map interface, the number of times the location is presented in a viewport of the map interface, and/or other appropriate online activity that relates to the location. The data can be obtained from a search system that maintains this data.

An attention score is determined for each location (304). The attention score for a location may be based on the user activity with respect to that location, user activity with respect to an entity located at that location, and/or the user activity with respect to locations around that location. For example, location A may have a higher attention score than location B if more queries that specify location A have been received than the number of queries that specify location B (assuming the other user activity is equal or not considered).

The effect of user activity events on locations can vary over time and based on a distance from the location of the event, as described above. For example, older events may have less effect on the attention score than more recent events. In another example, the effect of an event at a particular location may affect the attention scores for surrounding areas based on a decay function.

Locations are selected as map attention spots based on the attention scores (306). In some implementations, each location that has an attention score that meets an attention score threshold may be selected as a map attention spot. Alternatively, a certain percentage of the locations within a particular area and that have the highest attention scores may be selected as the map attention spots for that particular area. For example, in a particular state, the top 20% of the locations in the state by attention score may be selected as the map attention spots for that state.

Figure 4:
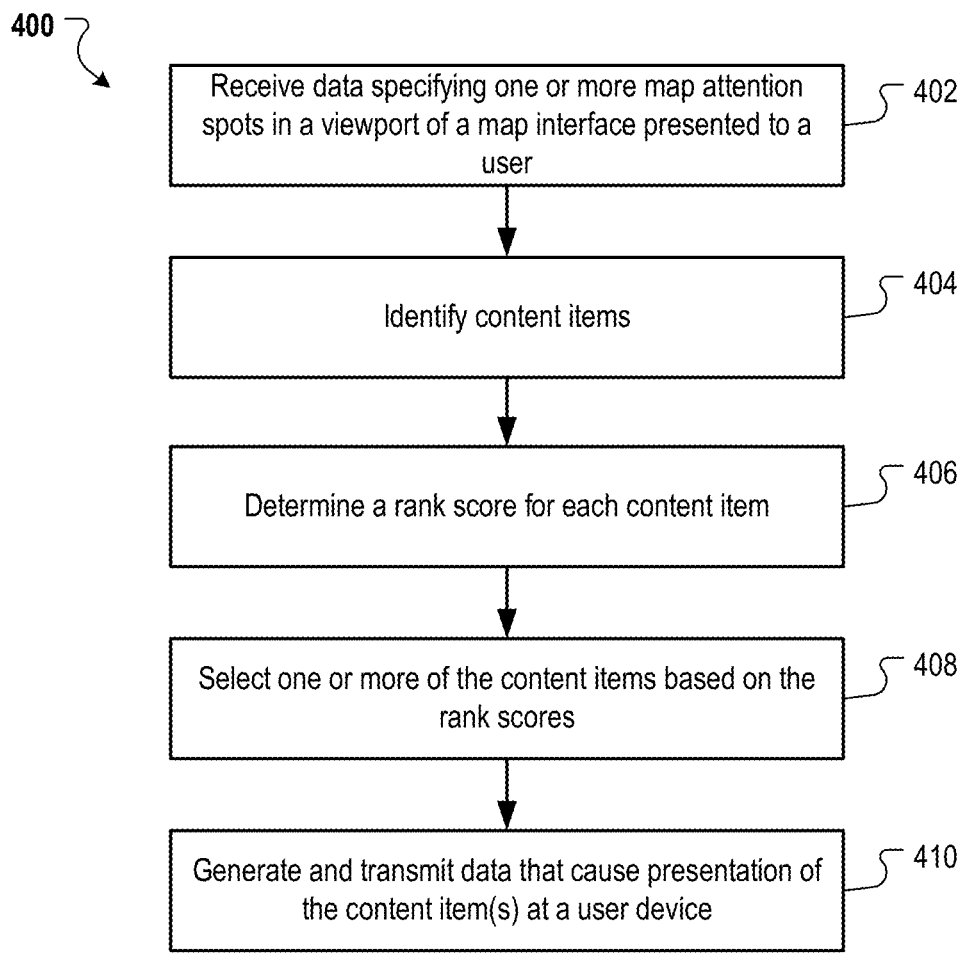
FIG. 4 is a flow chart of an example process for selecting and providing content items.

FIG. 4 is a flow chart of an example process 400 for selecting and providing content items. Operations of the process 400 can be implemented, for example, by a data processing apparatus, such as the content distribution system 150 of FIG. 1. The process 400 can also be implemented by instructions stored on computer storage medium, where execution of the instructions by a data processing apparatus cause the data processing apparatus to perform the operations of the process 400.

Data specifying one or more map attention spots in a viewport of a map interface are received (402). For example, a user may be viewing a portion of a map using a viewport of the map interface. The portion of the map visible in the viewport may include one or more map attention spots.

The map interface or a web browser or application that presents the map interface may include space to present content items, e.g., content item slots. A map system or the user device presenting the map interface may send a content item request to a content distribution system. The content item request may include data specifying the map attention spots in the viewport, the location of the map attention spots on the map (e.g., using coordinates), content items or entities that have locations in the viewport, and/or the locations of the content items or entities on the map (e.g., also using coordinates). The content item request may also include attention scores for each map attention spot. For example, a map system and/or search system may provide the attention scores to a content distribution system that selects and provides content items. For content item requests that originate from a user device, the content distribution system may obtain the attention scores from the map system.

Content items are identified for the user (404). The content items may include the content items having locations in the viewport and/or content items that do not have locations in the viewport (e.g., content items with a location that is within a threshold distance from the viewport). Content items may also be identified based on context data. For example, the context data may include data regarding a web page on which the map is being displayed or a query submitted by the user. The context data may also include previous queries submitted by the user or other appropriate context data. If a content item that has a location in the viewport also has distribution criteria that match the context data, the content item may be identified as a content item to be ranked for the content item request.

A rank score is determined for each content item (406). The rank score for a content item can be based on a content item score that represents the relative importance of the content item with respect to other content items. The rank score for a content item can also be based on one or more of the attention spots in the viewport. For example, the rank score for a content item may be based on the attention score for a map attention spot and/or the distance between the location of the content item on the map and the location of the map attention spot on the map, as described above. The distances can be determined based on the location data provided with the content item request.

In some implementations, the rank score may be determined by applying a boost or adjustment to the content item score based on a map attention spot. The boost may be proportional to the attention score for the map attention spot and inversely proportional to the distance between the map attention spot and the content item's location. In some implementations, the boost is based on the attention score and is constant for content items that are located within a threshold distance of the map attention spot. In this example, if the content item is located further from the map attention spot than the threshold distance, the rank score for the content item may not receive a boost based on the map attention spot.

In some implementations, the boost may decrease with distance from the map attention spot based on a first decay function within the threshold distance of the map attention spot and the boost may decrease with distance from the map attention spot based on a second decay function outside the threshold distance of the map attention spot. For example, the boost may decrease at a slower rate for locations within the threshold distance of the map attention spot than the rate at which the boost decreases outside the threshold distance.

If a content item is eligible to receive a ranking boost from multiple map attention spots, an attention spot-content item score may be determined for each of the multiple map attention spots with respect to the content item. In some implementations, a content item may be eligible to receive a ranking boost from each map attention spot in the viewport. In some implementations, a content item may only be eligible to receive a ranking boost from map attention spots that are located on the map within a threshold distance of the location of the content item on the map.

As described above, the attention spot-content item score for a particular map attention spot and particular content item may be based on the attention score for the particular map attention spot and the distance between the particular map attention spot and the particular content item's location on the map. For example, the attention spot-content item score may be directly proportional to the attention spot score and indirectly proportional to the distance. In another example, the attention spot score may decay with an increase in distance between the map attention spot and the content item's location based on a decay function.

The rank score for a content item that is eligible to receive a ranking boost from multiple map attention spots can be based on the content item score for the content item and the attention spot-content item score for each of the multiple map attention spots with respect to the content item. For example, the rank score may be the product of the content item score and each of the attention spot-content item scores.

One or more of the content items are selected based on the rank scores (408). For example, a particular number of the content items that have the highest rank scores may be selected for presentation to the user. The particular number may be based on the number of content item slots specified by the content item request.

Data that cause presentation of the selected content item(s) are generated and provided to the user device presenting the map interface (410). For example, the data may include data for presenting the content item(s) on or with a map. The data may also include instructions that cause the user device to present the content items on or with the map.

User interactions with a map interface can also be used to determine the areas of a map that the user is likely viewing. For example, if a user scrolls or pans in a particular direction, the user may be interested in areas of the map that are along a line that represents the scroll or pan direction.

Figure 5:
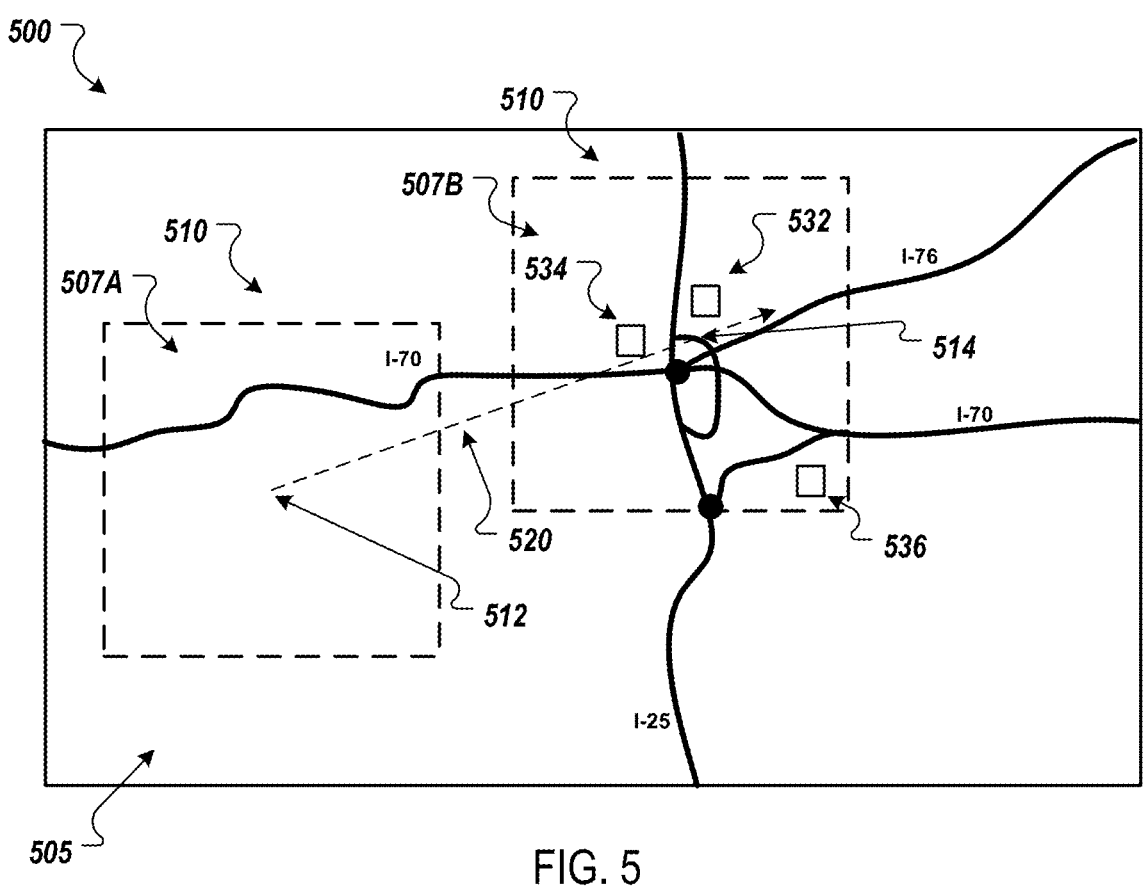
FIG. 5 depicts an example map interface in which a map portion visible in a viewport is changed based on user interaction with the map interface.

FIG. 5 depicts an example map interface 500 in which a map portion visible in a viewport 510 is changed based on user interaction with the map interface 500. The map interface 500 allows a user to view portions of the map 505 using the viewport 510. The map interface 500 may be included in a web page as shown in FIG. 2 or in an application (e.g., a mobile app). The viewport 510 defines the area of the map 505 that is visible to the user on the web page of application. For example, the viewport 510 can span a map display area of the web page or application.

The portion of the map presented in the viewport 510 can be changed, e.g., based on user interaction with the map interface 500. For example, the user may reposition the map 505 with respect to the viewport using a directional control or by swiping a touchscreen with a finger, stylus, or other appropriate pointer. In a particular example, the user can view a portion of the map 505 that is above a portion of the map 505 currently presented in the viewport by swiping in a downwards direction with respect to the map 505.

In FIG. 5, a map portion 507A of the map 505 is presented in the viewport 510. While the map portion 507A is presented in the viewport 510, a user may interact with the map interface 500 to view a second map portion 507B. For example, the user may swipe in a direction opposite the line 520 to cause the map portion 507B to be presented in the viewport 510. The portion of the map 505 displayed in the viewport 510 can also be adjusted by zooming. For example, the map interface 500 may allow a user to zoom into an area or out from an area of the map 505.

The direction in which the map 505 is repositioned with respect to the viewport 510 can be used to rank content items as this direction may be an indication of the user's attention with respect to the map 505. For example, the line 520 can be determined based on the repositioning of the map 505. The line 520 represents the direction in which the map 505 was repositioned with respect to the viewport 510, for example, in response to a user command. For example, the line 520 can have a trajectory that matches a direction of scroll or pan by the user. The line 520 can be determined based on a first reference point location 512 on the map 505 that is presented in the viewport 510 prior to the user interaction and a second reference point location 514 on the map 505 that is presented in the viewport 510 after the user interaction. For example, the reference point location 512 may be a location on the map 505 that is located at the center of the viewport 510 prior to the user interaction. The reference point location 514 may be a location on the map 505 that is located at the center of the viewport 510 after the user interaction. The line 520 may extend from the reference point location 512 to the reference point location 514. The line 520 may also extend pass these reference point locations, for example, to the ends of the map 505. Or, the line 520 may only extend within the viewport 510. For example, the line 520 may pass through the center of the viewport 510 and to the sides of the viewport 510 in which the line 520 would pass. Although the line 520 is shown in the viewport 510, the line 520 may not actually be visible to a user viewing the map 505 using the map interface 500.

The location of the line 520 can be used to rank content items for the user. For example, the location of the line 520 may be used to rank content items that have locations within the viewport 510, e.g., the content items for content item locations 532-536. The location of the line 520 may also be used to rank content items that are located outside of the viewport 510.

The rank score of a content item may be based on a content item score for the content item and/or a distance between a location for the content item on the map and a location on the line 520. The location on the line 520 may be the location of the line 520 that is closest to the location for the content item. In some implementations, the rank score for a content item is based on the content item score for the content item and a boost factor that is based on the distance between the location for the content item and the line 520. For example, the rank score for the content item may be proportional to a product of the content item score for the content item and the boost factor. The boost factor may decrease with an increase in distance between the content item and the line 520. For example, the boost factor may decrease with an increase in distance based on a decay function. In this example, the boost factor for the content item of content item location 534 may be greater than the boost factor for the content item of content item location 536.

In some implementations, the rank score for a content item is based on whether the content item's location is within a threshold distance of the line 520. For example, the rank score for a content item that has a location within the threshold distance of the line 520 may receive a boost, while the rank score for a content item that does not have a location within the threshold distance of the line 520 may not receive a boost in its rank score. In this example, the rank score for a content item that has a location within the threshold distance of the line 520 may be based on a content item score for the content item and a boost factor for the line 520. For example, the rank score for the content item may be proportion to a product of the content item score for the content item and the boost factor for the line 520.

Figure 6:
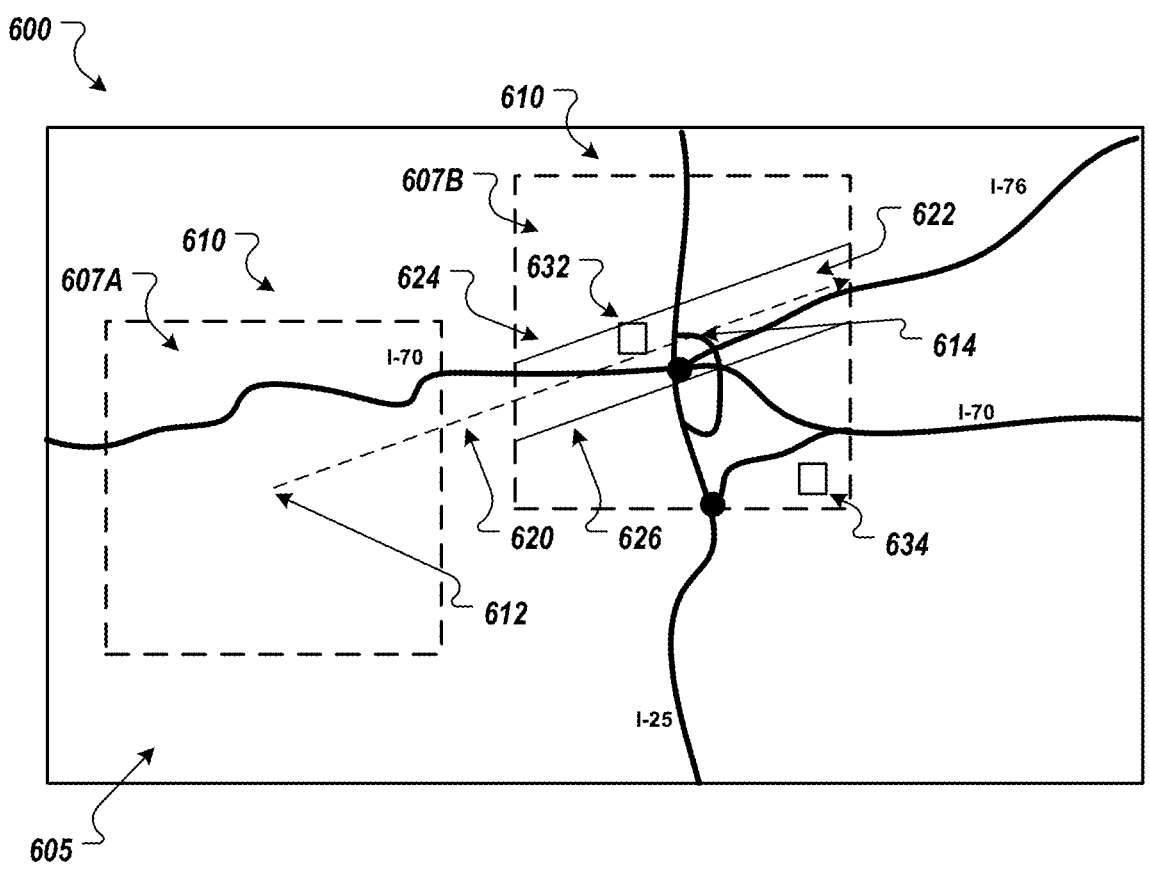
FIG. 6 depicts another example map interface in which a map portion visible in a viewport is changed based on user interaction with the map interface.

FIG. 6 depicts another example map interface 600 in which a map portion visible in a viewport 610 is changed based on user interaction with the map interface 600. In this example, the viewport 610 presented a map portion 607A before a user interaction with the map interface 600 and a map portion 607B based on the user interaction. In addition, a line 620 has been determined based on the repositioning of the map 605 with respect to the viewport 610 in response to the user interaction.

A map attention area 622 for the line 620 can be used to determine rank scores for content items. The map attention area 622 is defined by lines 624 and 626 on either side of the line 620. Each line 624 and 626 may be positioned a particular distance from the line 620, as described in more detail below. The map attention area 622 may be the area between the lines 624 and 626 that intersects the viewport 610.

In some implementations, a content item that has a location that is within the map attention area 622 may receive a boost in its rank score while a content item that does not have a location within the map attention area 622 may not receive a boost in its rank score. The rank score for a content item that has a location that is within the map attention area 622 may be based on a content item score for the content item and a boost factor for the map attention area 622. For example, the rank score for the content item may be proportional to a product of the content item score for the content item and the boost factor for the map attention area 622. In this example, the rank score for the content item having a content item location 632 may be based on a boost factor, while the content item having a content item location 634 may not be based on the boost factor (e.g., may be based only on the content item score for the content item).

In some implementations, the boost factor for a content item may vary based on whether the content item has a location within the map attention area 622 and a distance between the content item's location on the map 605 and the line 620. For example, the rank score for a content item that has a location within the map attention area 622 may be based on a first boost factor. This first boost factor may decay with an increase in distance from the line 620. For example, the first boost factor may be greater for content items that have a location on the line 622 than for content items that have a location on the line 624.

The rank score for a content item that has a location outside of the map attention area 622 may be based on a second boost factor that is different from the first boost factor. For example, the first boost factor may be greater than the second boost factor. The second boost factor may decay with an increase in distance from the map attention area 622. For example, the second boost factor may be greater for a content item that has a location just outside the line 626 than the second boost factor for the content item for content item location 634.

The first and second boost factors may decay at the same or different rates. For example, the second boost factor may decay at a faster rate than the first boost factor. In some implementations, the first boost factor is constant within the map attention area 622 while the second boost factor decays with an increase in distance from the map attention area 622.

The size of the map attention area 622 can be based on the distance between a first reference point location 612 on the map 605 that is presented in the viewport 610 prior to the user interaction and a second reference point location 614 that is presented in the viewport 610 after the user interaction. The reference point location 612 may be the location on the map 605 that is located at the center of the viewport 610 prior to the user interaction. Similarly, the reference point location 614 may be the location on the map 605 that is located at the center of the viewport 610 after the user interaction. The size of the map attention area 622 may also be based on the scale of the viewport 610, for example, after the user interaction. For example, the distance from each line 624 and 626 to the line 620 can be based on the distance between the reference point location 612 and the reference point location 614 and/or the scale of the viewport 610.

In some implementations, the size of the map attention area 622 is inversely proportional to the distance between reference point locations 612 and 614. For example, the distance from each line 624 and 626 to the line 620 may be inversely proportional to the distance between the reference point locations 612 and 614. The distance between the reference point locations 612 and 614 can be normalized based on the zoom scale of the viewport 610 prior to being used to determine the size of the map attention area. For example, the width of the map attention area 622 (i.e., the distance between the lines 624 and 626) can be determined using the relationship $W = W_0 e^{-\lambda l}$, in which W is the resulting width of the map attention area 622; $W_0$ is the larger dimension of the viewport 610 (i.e., the longer of the height and width of the viewport); l is the normalized length of a line connecting the reference point locations 612 and 614; and X is an exponential parameter.

A user may interact with the map interface multiple times (e.g., scroll multiple times) to change the area of the map presented in the viewport. For example, a user may scroll multiple times looking for a particular area. Multiple lines may be determined in response to multiple user interactions. The multiple lines may then be used to rank content items as each line indicates the user's area of attention.

Figure 7:
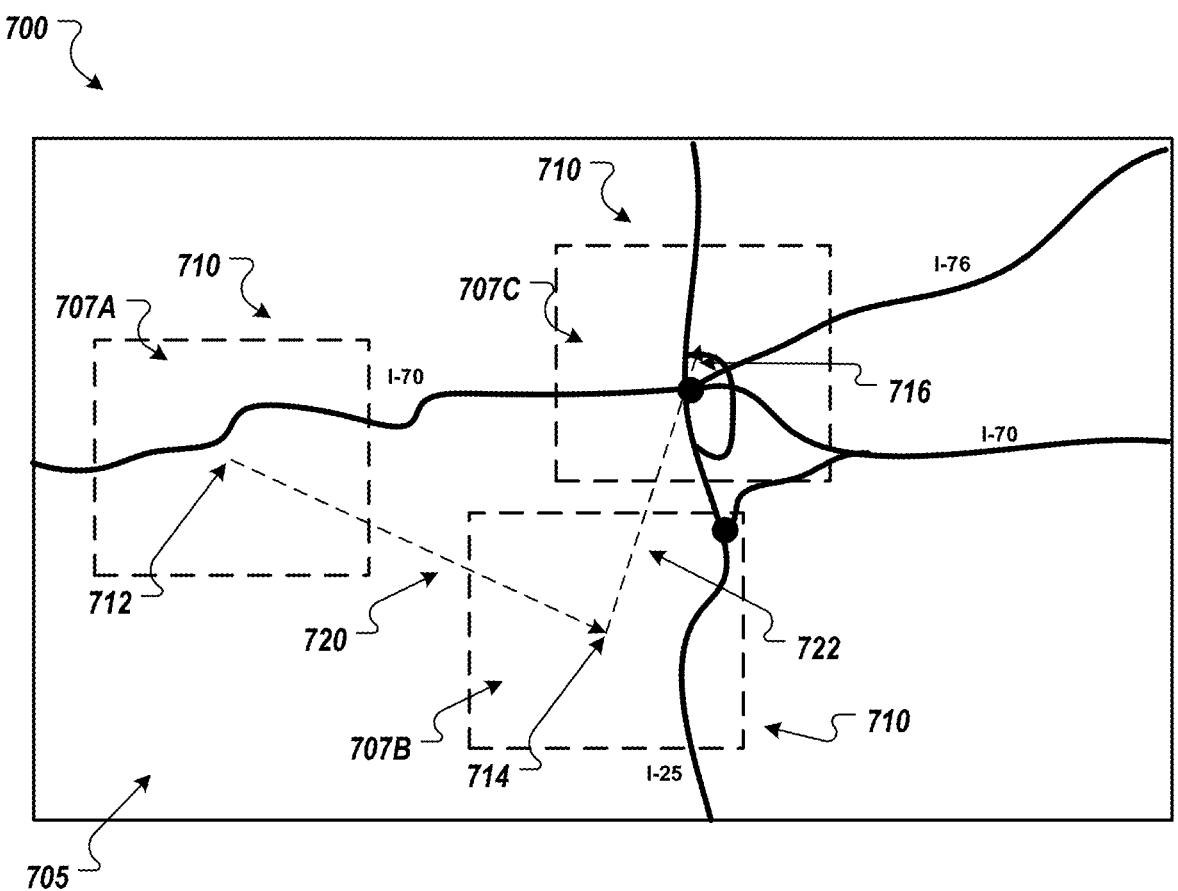
FIG. 7 depicts another example map interface in which a map portion visible in a viewport is changed based on user interaction with the map interface.

FIG. 7 depicts another example map interface 700 in which a map portion visible in a viewport 710 is changed based on user interaction with the map interface 700. In this example, the viewport 710 presented a map portion 707A before a first user interaction with the map interface 700 and a map portion 707B based on the first user interaction. In addition, the viewport 710 presented a map portion 710C based on a second user interaction that occurred while the map portion 707B was presented in the viewport 710.

A first line 720 has been determined based on the repositioning of the map 705 with respect to the viewport 710 in response to the first user interaction. For example, the first line 720 may extend between, and through, a reference point location 712 on the map 705 that is located at the center of the viewport 710 before the first user interaction and a reference point location 714 on the map that is located at the center of the viewport 710 after the first user interaction. A second line 722 has been determined based on the repositioning of the map 705 with respect to the viewport 710 in response to the second user interaction. For example, the second line 722 may extend between, and through, a reference point location 714 on the map that is located at the center of the viewport 710 before the second user interaction and a reference point location 716 on the map that is located at the center of the viewport 710 after the second user interaction.

In some implementations, only the second line 722 is used to rank content items. For example, the second line 720 can be used similarly to the way in which the lines were used in FIGS. 6 and 7.

In some implementations, both lines 720 and 722 (and optionally more lines if there were additional repositioning of the map 705 with respect to the viewport 710) can be used to rank content items. For example, each line 720 and 722 can be located at their respective locations on the map 705 and the rank scores of content items that are near at least one of the lines 720 and 722 can be boosted based on their location near the line(s). For example, the rank score of a content item that is located within a specified threshold distance of the line 720 may be based on a content item score for the content item and a boost factor for the line 720 (e.g., subject to any decay function based on distance from the line 720). The rank score for the content item may also be based on a boost factor for the line 722, for example, if the content item is within a threshold distance of the line 722. For example, the rank score for the content item may be proportional to the product of the content item score, the boost factor for line 720, and the boost factor of line 722.

The boost factor for each line 720 and 722 can vary as described above with reference to FIG. 5 or 6, for example, based on a decay function within or outside a map attention area for the line. Each line 720 may also have a different base boost factor. For example, the base boost factor for the line 722 may be greater than the base boost factor for the line 720 based on the line 722 being for the most recent viewport movement. Each base boost factor may decay with an increase in distance from its respective line. For example, the base boost factor for the line 722 may be used for a content item that has a location directly on, or within a threshold distance from, the line. The base boost factor may then decay with an increase in distance from the line 722, for example, based on a decay function.

In some implementations, the location of each line 720 and 722 is superimposed over the map portion currently being presented in the viewport 710, e.g., the map portion presented after the second user interaction. In this example, the line 722 is located in the map portion that is presented in the viewport 710 after the second user interaction. However, the line 720 is not located in the map portion that is presented in the viewport 710 after the second user interaction. This line 720 can be moved to the map portion that is presented in the viewport 710 after the second user interaction. For example, the line 720 can be moved such that the line 720 maintains its trajectory but passes through the center of the viewport 710 and the map portion currently presented in the viewport 710. An example of this implementation is shown in FIG. 8.

Figure 8:
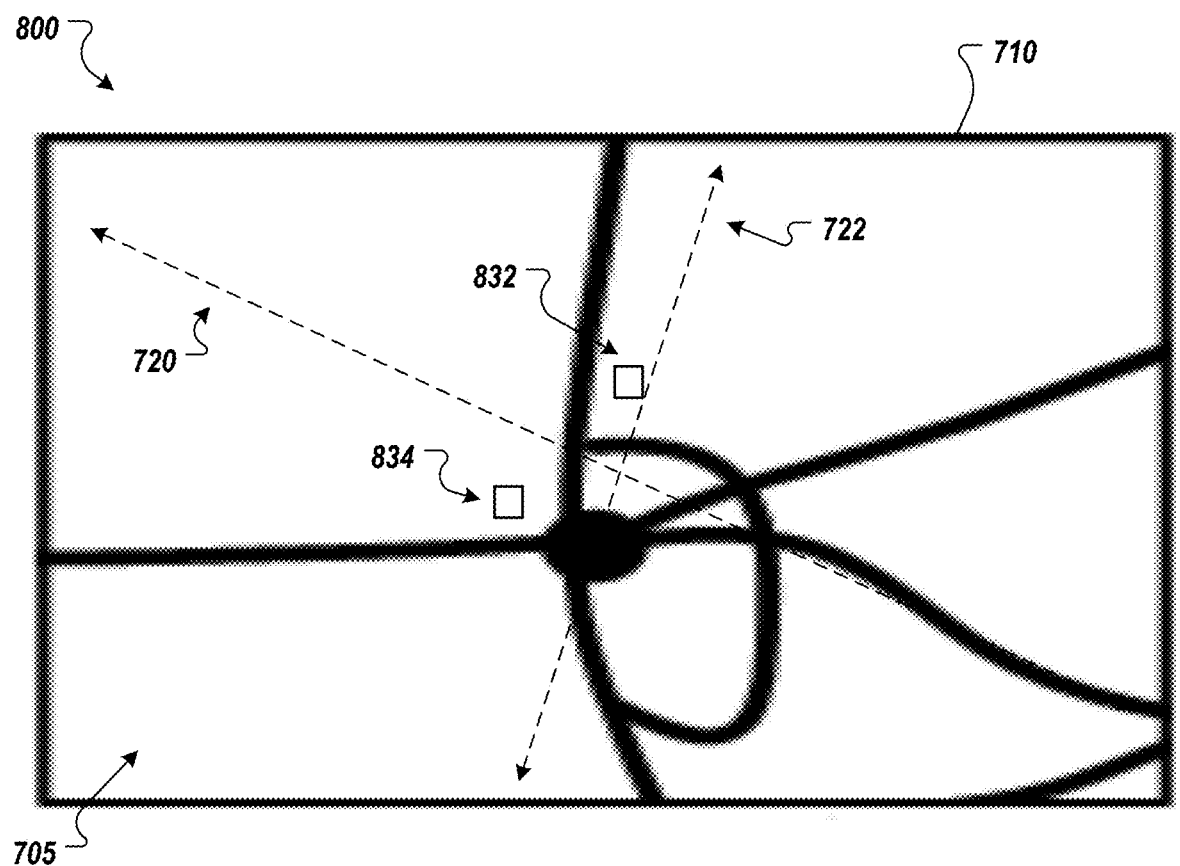
FIG. 8 depicts a viewport of an example map interface.

FIG. 8 depicts the viewport 710 in an example map interface 800. In the example map interface 800, the line 720 has been superimposed in the viewport 710 with the line 722. The lines 720 and 722 are shown for reference, but may not be shown in an actual viewport that displays an area of the map 705. That is, the lines 720 and 722 may not be visible to a user viewing the map 705.

In this example, both lines 720 and 722 pass through the center of the viewport 710 and are in their original trajectory. The lines 720 and 722 can be used to rank content items, such as the content items for content item locations 832 and 834. For example, the rank score for the content item for content item location 832 can be based on a content item score for the content item and a boost factor for the line 722 and/or a boost factor for the line 720. Similarly, the rank score for the content item for content item location 834 can be based on a content item score for the content item and a boost factor for the line 720 and/or a boost factor for the line 722. The effect of each line 720 and 722 on the rank score of a content item can be based on the distance between the content item's location and each line 720 and 722 in the viewport 710, as described above with reference to FIGS. 5-7.

Figure 9:
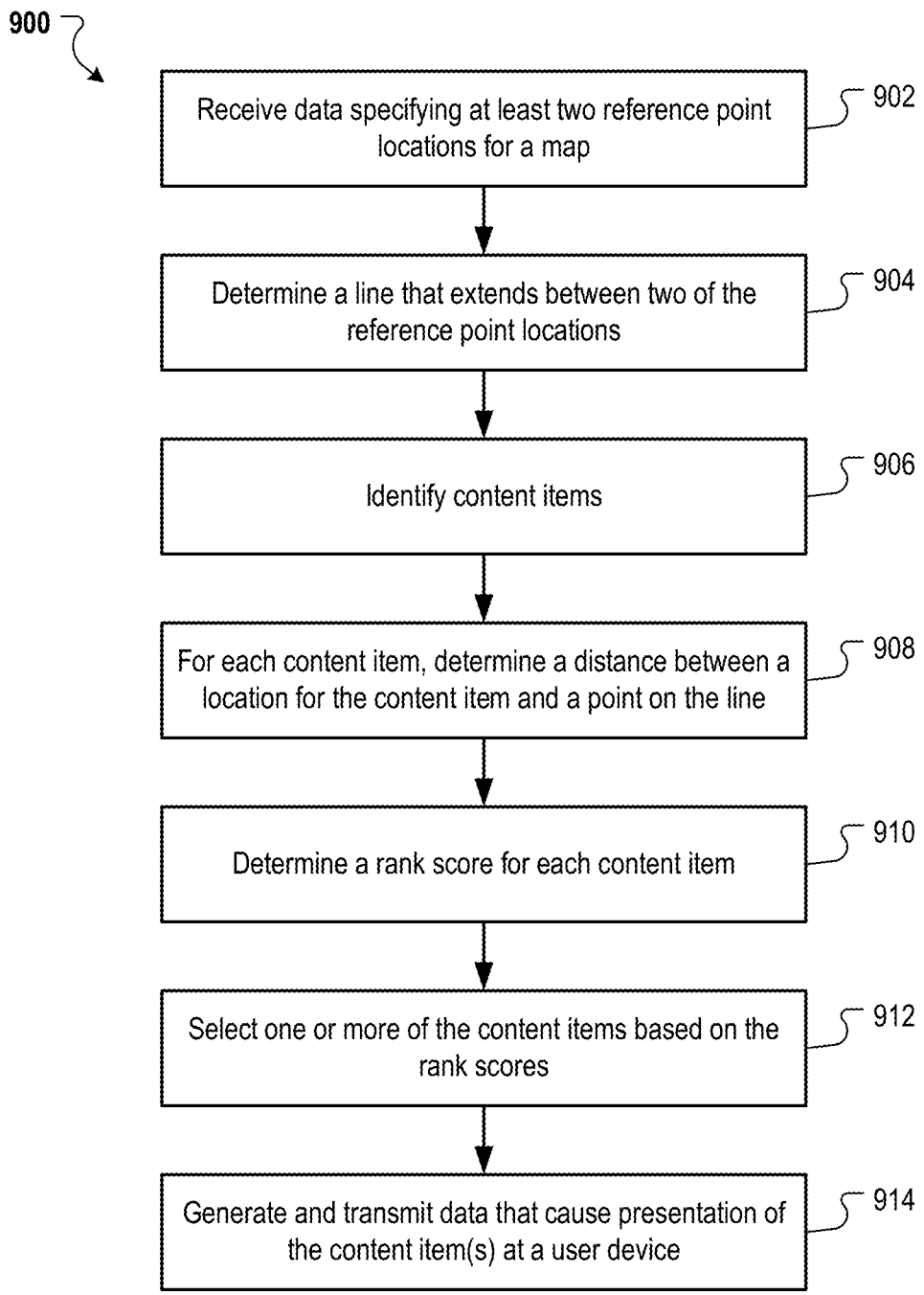
FIG. 9 is a flow chart of an example process for ranking content items and providing content items based on the ranking.

FIG. 9 is a flow chart of an example process 900 for ranking content items and providing content items based on the ranking. Operations of the process 900 can be implemented, for example, by a data processing apparatus, such as the content distribution system 150 of FIG. 1. The process 900 can also be implemented by instructions stored on computer storage medium, where execution of the instructions by a data processing apparatus cause the data processing apparatus to perform the operations of the process 900.

Data is received that specifies two or more reference point locations for a map presented in a map interface (902). For example, a user viewing the map using a viewport of the map interface may reposition the map with respect to the viewport in order to view other areas of the map. Location data specifying a reference point location of the map in the viewport prior to the user interaction and after the user interaction can be provided by the user device presenting the map interface. For example, the center of a map portion presented in the viewport prior to the user scrolling or panning to a new map portion may be identified as a first reference point location. A second reference point location may be identified as the center of the map portion that is presented in the viewport after the user interaction. The data may specify the location on the map of the first reference point location and the location on the map of the second reference point location.

The reference point locations may be provided in response to each user interaction. For example, a user may scroll multiple times looking for a particular area. For each scroll event, a reference point location for the center of the viewport before the scroll event and the reference point location for the center of the viewport after the scroll event may be provided.

A line is determined that extends between two reference point locations (904). For example, a line may be determined for the reference point location in the map portion currently presented in the viewport and the immediately preceding reference point location. This line may be in the direction of movement from the preceding reference point location to the current reference point location. A similar line may also be determined for one or more previous pairs of successive reference point locations.

Content items are identified for the user (906). The content items may include the content items having locations in the map portion that is currently being presented in the viewport and/or content items that do not have locations in the map portion that is currently being presented (e.g., content items with a location that is within a threshold distance from the map portion). Content items may also be identified based on context data. For example, the context data may include data regarding a web page on which the map is being displayed or a query submitted by the user. The context data may also include previous queries submitted by the user or other appropriate context data. If a content item that has a location in the viewport also has distribution criteria that match the context data, the content item may be identified as a content item to be ranked for the content item request.

For each content item, a distance is determined between the location for the content item on the map and each line (908). For example, the distance may be the distance between the location for the content item on the map and the closest point on the line to the location for the content item.

A rank score is determined for each content item (910). The rank score for a content item can be based on a content item score that represents the relative importance of the content item with respect to other content items. The rank score for a content item can also be based on the distance between a location for the content item on the map and the location of the line (e.g., a point on the line closest to the content item's location) determined for the two most recent reference point locations. The rank score for the content item may also be based on the distance between a location for the content item on the map and the location of one or more additional lines determined for one or more respective pairs of reference point locations. For example, the rank score for each content item may be determined using one or more of the techniques illustrated in FIGS. 5-8 and described above.

One or more of the content items are selected based on the rank scores (912). For example, a particular number of the content items that have the highest rank scores may be selected for presentation to the user. The particular number may be based on the number of content item slots specified by the content item request.

Data that cause presentation of the selected content item (s) are generated and provided to the user device presenting the map interface (914). For example, the data may include data for presenting the content item(s) on or with a map. The data may also include instructions that cause the user device to present the content items on or with the map.

In some implementations, map attention spots and lines determined based on user activity with respect to a map interface can be used together to rank or adjust the rank of content items. For example, the rank score of a content item can be based on a content item score for the content item, a boost from map attention spots located near the location of the content item, and a boost from one or more lines located near the location of the content item.

Figure 10:
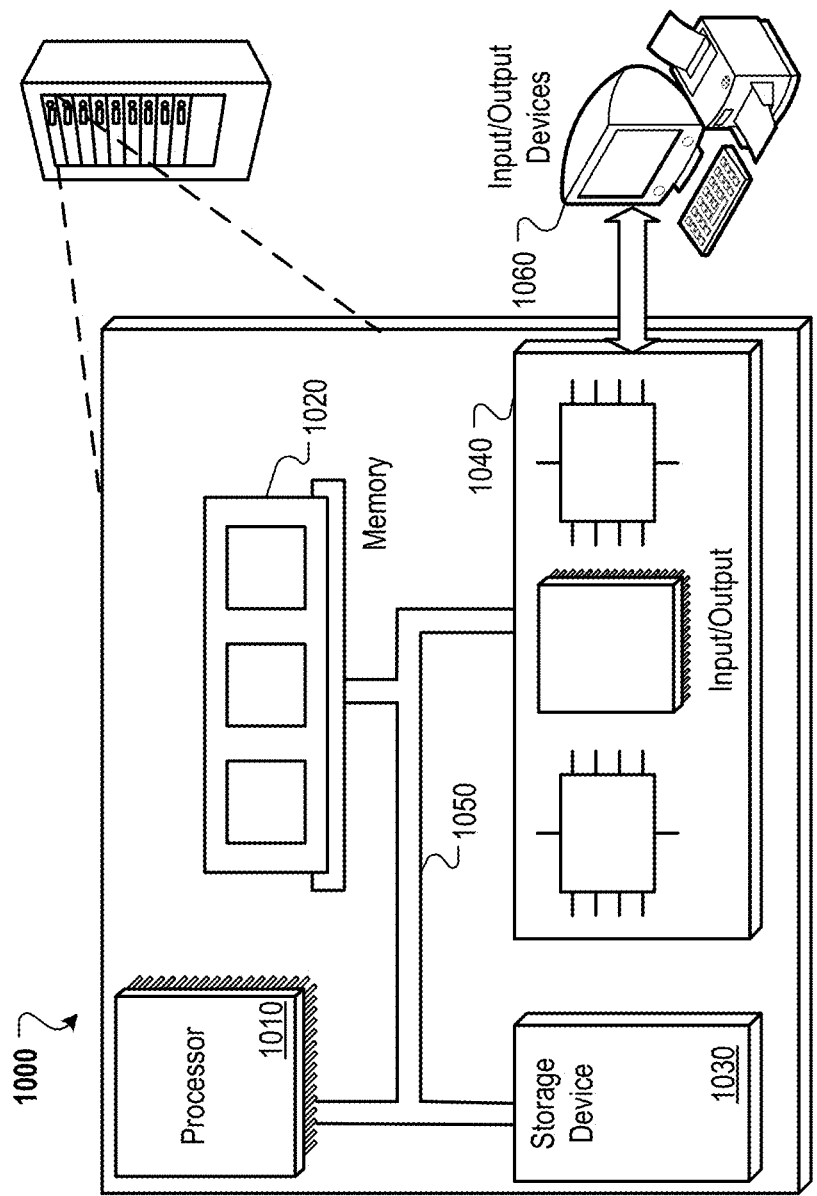
FIG. 10 is a block diagram of an example computer system.

FIG. 10 is a block diagram of an example computer system 1000 that can be used to perform operations described above. The system 1000 includes a processor 1010, a memory 1020, a storage device 1030, and an input/output device 1040. Each of the components 1010, 1020, 1030, and 1040 can be interconnected, for example, using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1020 or on the storage device 1030.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1000. In one implementation, the storage device 1030 is a computer-readable medium. In various different implementations, the storage device 1030 can include, for example, a hard disk device, an optical disk device, a storage device that is shared over a network by multiple computing devices (e.g., a cloud storage device), or some other large capacity storage device.

The input/output device 1040 provides input/output operations for the system 1000. In one implementation, the input/output device 1040 can include one or more of a network interface device, e.g., an Ethernet card, a serial communication device, e.g., an RS-232 port, and/or a wireless interface device, e.g., an 802.11 card. In another implementation, the input/output device can include driver devices configured to receive input data and send output data to other input/output devices, e.g., keyboard, printer and display devices 1060. Other implementations, however, can also be used, such as mobile computing devices, mobile communication devices, set-top box television client devices, etc.

Although an example processing system has been described in FIG. 10, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
   identifying, by a computing system, for each of a plurality of locations displayed in a viewport, an interest score based on a level of user activity that occurred at the location;
   selecting, by the computing system, a subset of the plurality of locations, each location in the subset selected based on a determination that the interest score meets a location selection criterion;
   identifying, by the computing system, a plurality of candidate media content items, wherein each candidate media content item in the plurality of candidate content items is distinct from each location in the subset of the plurality of locations, wherein a first location assigned to a first candidate media content item in the plurality of candidate media content items is separated by a respective distance from each location in the subset of the plurality of locations, wherein a media content item is one of a image content item or a video content item and each media content item has an initial content item score;
   increasing, by the computing system, the initial content item score for a subset of the plurality of candidate media content items including the first candidate content item, wherein the initial content item score for each candidate media content item in the subset is increased by:
      determining a nearest location from the selected subset of the plurality of locations for which the level of user activity that was identified as having occurred at the location was determined to meet the location selection criterion;
      determining a distance from a location associated with the candidate media content item to the nearest location from the selected subset of the plurality of locations;
      generating a modified content item score for the candidate media content item by increasing the initial content item score based on the interest score for the nearest location and the distance from the location associated with the media content item to the nearest location;
   selecting, by the computing system, one or more candidate media content items from the plurality of candidate media content items based, at least in part, on the modified content item score associated with each candidate media content item; and
   providing, to a computing device, data for causing the computing device to present visual indications of one or more locations in the selected subset of the plurality of locations and media content items from the selected subset of the plurality of candidate media content items in a viewport of a map interface.

2. The method of claim 1, comprising identifying a particular location for inclusion in the selected subset of the plurality of locations based on at least one of a number of queries received by a search system that relate to the particular location, a number of selections of search results related to the particular location, a number of selections related to the particular location in a map interface, or a number of times the particular location is presented in a viewport of a map interface.

3. The method of claim 1, wherein the level of user activity that is identified as having occurred at each of the plurality of locations is limited to user activity within a particular period of time.

4. The method of claim 1, comprising determining the interest score for each of the plurality of locations based on the level of user activity that was identified as having occurred at each respective location, wherein selecting the subset of the plurality of locations comprises analyzing respective interest scores of locations in the subset, wherein the interest score of a given location in the subset is based at least on an age of a user activity event that occurred at the location.

5. The method of claim 4, wherein the interest score of a given location in the subset is based at least on a distance of the given location from a location associated with a user activity event.

6. The method of claim 1, wherein the plurality of candidate media content items comprise media content items that are each associated with a geographic location.

7. A system comprising:
   a data processing apparatus; and
   a memory in data communication with the data processing apparatus and storing instructions executable by the data processing apparatus and that upon such execution cause the data processing apparatus to perform operations comprising:
   identifying for each of a plurality of locations displayed in a viewport, an interest score based on a level of user activity that occurred at the location;
   selecting a subset of the plurality of locations, each location in the subset selected based on a determination that the interest score meets a location selection criterion;
   identifying a plurality of candidate media content items, wherein each candidate media content item in the plurality of candidate content items is distinct from each location in the subset of the plurality of locations, wherein a first location assigned to a first candidate media content item in the plurality of candidate media content items is separated by a respective distance from each location in the subset of the plurality of locations, wherein a media content item is one of a image content item or a video content item and each media content item has an initial content item score;
   increasing the initial content item score for a subset of the plurality of candidate media content items including the first candidate content item, wherein the initial content item score for each candidate media content item in the subset is increased by:
      determining a nearest location from the selected subset of the plurality of locations for which the level of user activity that was identified as having occurred at the location was determined to meet the location selection criterion;
      determining a distance from a location associated with the candidate media content item to the nearest location from the selected subset of the plurality of locations; and
      generating a modified content item score for the candidate media content item by increasing the initial content item score based on the interest score for the nearest location and the distance from the location associated with the media content item to the nearest location;
   selecting one or more candidate media content items from the plurality of candidate media content items based at least in part, on the modified content item score associated with each candidate media content item; and
   providing, to a computing device, data for causing the computing device to present visual indications of one or more locations in the selected subset of the plurality of locations and media content items from the selected subset of the plurality of candidate media content items in a viewport of a map interface.

8. The system of claim 7, wherein the operations comprise identifying a particular location for inclusion in the selected subset of the plurality of locations based on at least one of a number of queries received by a search system that relate to the particular location, a number of selections of search results related to the particular location, a number of selections related to the particular location in a map interface, or a number of times the particular location is presented in a viewport of a map interface.

9. The system of claim 7, wherein the level of user activity that is identified as having occurred at each of the plurality of locations is limited to user activity within a particular period of time.

10. The system of claim 7, wherein the operations comprise determining the interest score for each of the plurality of locations based on the level of user activity that was identified as having occurred at each respective location, wherein selecting the subset of the plurality of locations comprises analyzing respective interest scores of locations in the subset, wherein the interest score of a given location in the subset is based at least on an age of a user activity event that occurred at the location.

11. The system of claim 10, wherein the interest score of a given location in the subset is based at least on a distance of the given location from a location associated with a user activity event.

12. The system of claim 7, wherein the plurality of candidate media content items comprise media items that are each associated with a geographic location.

13. One or more non-transitory computer-readable media encoded with instructions that, when executed by data processing apparatus, cause performance of operations comprising:
   identifying for each of a plurality of locations displayed in a viewport, an interest score based on a level of user activity that occurred at the location;
   selecting a subset of the plurality of locations, each location in the subset selected based on a determination that the interest score meets a location selection criterion;
   identifying a plurality of candidate media content items, wherein each candidate media content item in the plurality of candidate content items is distinct from each location in the subset of the plurality of locations, wherein a first location assigned to a first candidate media content item in the plurality of candidate media content items is separated by a respective distance from each location in the subset of the plurality of locations, wherein a media content item is one of a image content item or a video content item and each media content item has an initial content item score;
   increasing the initial content item score for a subset of the plurality of candidate media content items including the first candidate content item, wherein the initial content item score for each candidate media content item in the subset is increased by:
      determining a nearest location from the selected subset of the plurality of locations for which the level of user activity that was identified as having occurred at the location was determined to meet the location selection criterion;

determining a distance from a location associated with the candidate media content item to the nearest location from the selected subset of the plurality of locations; and generating a modified content item score for the candidate media content item by increasing the initial content item score based on the interest score for the nearest location and the distance from the location associated with the media content item to the nearest location;

selecting one or more candidate media content items from the plurality of candidate media content items based, at least in part, on the modified content item score associated with each candidate media content item; and providing, to a computing device, data for causing the computing device to present visual indications of one or more locations in the selected subset of the plurality of locations and media content items from the selected subset of the plurality of candidate media content items in a viewport of a map interface.

14. The computer-readable media of claim 13, wherein the operations comprise identifying a particular location for inclusion in the selected subset of the plurality of locations based on at least one of a number of queries received by a search system that relate to the particular location, a number of selections of search results related to the particular location, a number of selections related to the particular location in a map interface, or a number of times the particular location is presented in a viewport of a map interface.

15. The computer-readable media of claim 13, wherein the level of user activity that is identified as having occurred at each of the plurality of locations is limited to user activity within a particular period of time.

16. The computer-readable media of claim 13, wherein the operations comprise determining an interest score for each of the plurality of locations based on the level of user activity that was identified as having occurred at each respective location, wherein selecting the subset of the plurality of locations comprises analyzing respective interest scores of locations in the subset, wherein the interest score of a given location in the subset is based at least on an age of a user activity event that occurred at the location.

17. The computer-readable media of claim 16, wherein the interest score of a given location in the subset is based at least on a distance of the given location from a location associated with a user activity event.

18. The computer-readable media of claim 13, wherein the plurality of candidate media content items comprise media items that are each associated with a geographic location.

* * * * *